Dec. 3, 1946.    R. C. CUNNINGHAM    2,412,080
WELDING APPARATUS
Filed Dec. 7, 1943
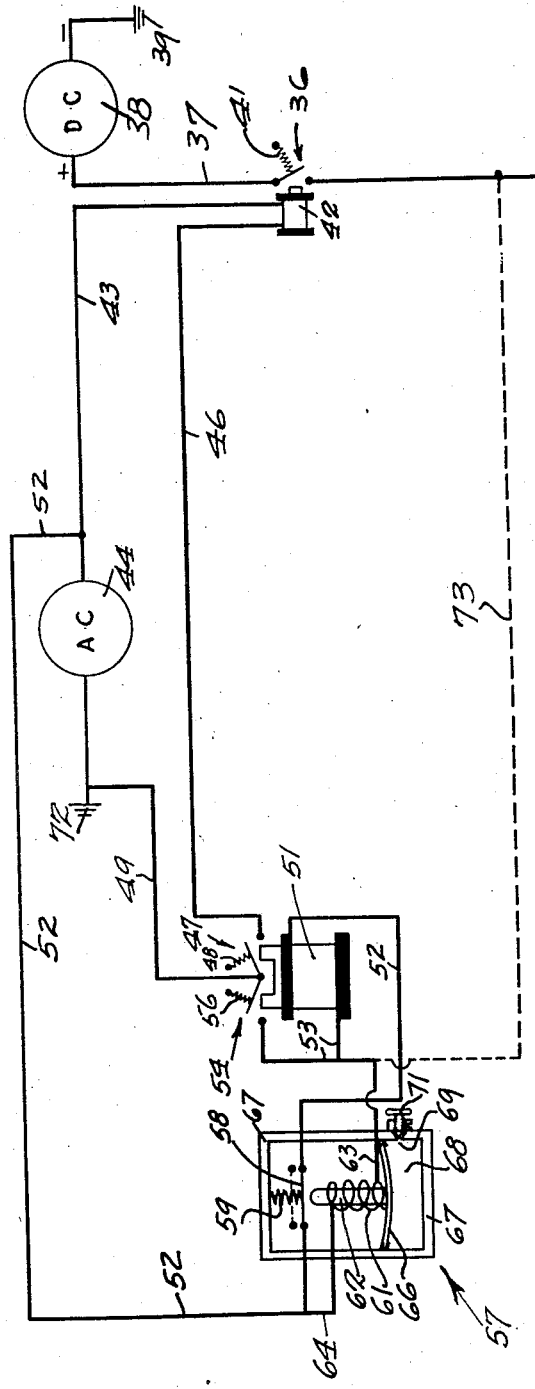
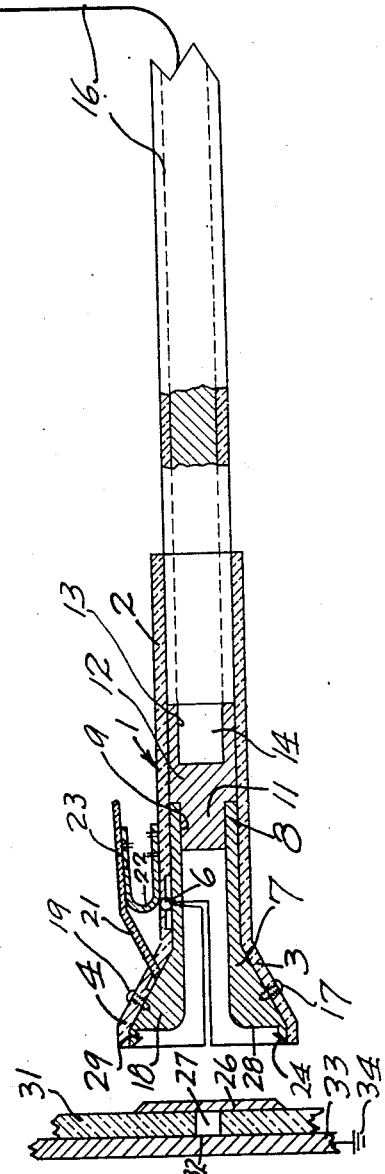
INVENTOR
ROBERT C. CUNNINGHAM
BY George B. White
ATTORNEY

Patented Dec. 3, 1946

2,412,080

UNITED STATES PATENT OFFICE 2,412,080

WELDING APPARATUS

Robert C. Cunningham, San Francisco, Calif.

Application December 7, 1943, Serial No. 513,210

8 Claims. (Cl. 219—4)

This invention relates to an electric welding method and apparatus and particularly to the type of welder used for end-welding studs and the like.

Heretofore when a stud or the like loose element was welded to a plate or another like element, a welding device was used with a separate welding circuit through an electrode and also a separate alternating current control circuit with a number of terminals and cables connected to the device and operated by a trigger manually. These previous devices also required springs or other pressure mechanisms to hold the loose element or stud spaced from the other element to allow the melting of the tip of the stud or the like and then to apply a sharp blow for driving the stud against the plate, thereby causing disturbance and splattering of the molten metal, creating air pockets and imperfect weldings. The operation of the device was awkward and inefficient on account of the complicated connections, manual trip control and suddenly released spring pressures.

An object of my invention is to provide a method and apparatus for quick welding of a loose element, such as a stud or the like, to another element, such as a plate, by holding the loose element in tight contact with the electrode of a welding circuit and in loose contact with the other element so as to permit the melting of the tip of the loose element into the small welding space at its tip and to allow its contraction into the welded joint without external pressure.

Another object of this invention is to provide a method and apparatus for welding a loose element to another element, especially when the loose element extends through an insulator, wherein the welding current is controlled by alternating current actuation, the initial alternating current circuit for such actuation being conducted through the electrode of the welding circuit and through said elements, and wherein said initial circuit is rendered ineffective substantially simultaneously with the closing of the welding circuit by said alternating current actuation, another alternating current circuit independent of the electrode continuing said actuation for a predetermined period.

Another object of the invention is to provide a welding method and apparatus wherein an alternating current circuit for controlling the welding current is initially closed through the electrode of the welding circuit and then shunted into an alternating current timing control circuit by the initial closing of said alternating current circuit independent of said electrode.

Another object of the invention is to provide a welding gun which easily grips a loose article, such as the head of a stud, and holds it tightly against the conductor or electrode in the gun, and which has an automatic control for the welding circuit which is actuated initially by the contact between the loose element and the member to which the loose element is to be welded and through the electrode of the welding circuit, and immediately upon said actuation is shunted to an actuating circuit independent of said loose element and of said electrode.

Another object of this invention is to provide a welding method and apparatus which is highly useful and simple in construction. Convenience of arrangement, lightness and comparative inexpense of manufacture are further objects which have been borne in mind in the production and development of the invention.

Other objects of the invention together with the foregoing will be set forth in the following description of the preferred method and preferred embodiment of means for practicing the same, which is illustrated in the drawing accompanying and forming part of the specification. It is to be understood that I do not limit myself to the embodiment disclosed in said description and the drawing as I may adopt variations of my preferred forms within the scope of my invention.

With the foregoing and other objects in view, which will be made manifest in the following detailed description, reference is had to the accompanying drawing for the illustrative embodiment of the invention, wherein, the figure shows a sectional view of the welding gun in operating position and a wiring diagram of the control circuits and the welding circuit for said welding gun.

While in the illustrative embodiment of my invention I show my method and apparatus applied to end-welding a stud to a plate for fastening an insulating lining in place, it is to be understood that my method and apparatus may be used for quick welding of any loose element to another element.

In my method the head of the stud is tightly gripped into and against the electrode of the welding circuit so as to prevent an arc or melting of the stud body or head. Then an initial alternating current control circuit is closed through said electrode, said stud and the plate to which the tip of the stud is contacted. It is preferable that said alternating current circuit be completed through grounding of said plate. An insulating lining or layer is laid on the plate prior to welding and the stud is pushed through this insulator lining and is held in loose contact with the plate throughout the welding operation. A timing circuit and a control circuit are closed by said initial, auxiliary alternating current circuit, and said auxiliary circuit through said electrode is simultaneously shunted out and rendered ineffective. The welding circuit of said electrode is substantially simultaneously closed by said control circuit. After a predetermined time the welding circuit is broken by the breaking of said control circuit by the action of the timing circuit. The stud is held in said loose contact with the plate until after the breaking of said welding circuit. The stud is being repelled away from said plate by the action of the welding circuit so far as loose contact holding permits, and after the breaking of said welding circuit the welded metal contracts and the stud is attracted or drawn tightly against the plate forming a solid welded joint without spattering or splashing of material and without air pockets or the like.

In the illustrative form of my apparatus I make use of a hollow insulator casing 1, formed with a stem 2 adapted to be conveniently held by the operator. A head 3 is formed at an end of the stem 2 in a flaring, frusto-conical form. This head 3 is split in substantially complemental halves. One of the split sections 4 is entirely separated from the casing and is attached in place by a transverse hinge 6 so as to be swingable into open and closed positions similarly to the action of a jaw of a chuck.

A conductor chuck is detachably secured into said casing head 3. This conductor chuck has a fixed jaw 7 in the fixed section of the head. A stem of this chuck jaw 7 extends into the stem 2 of the casing and has a socket 9 thereof tightly fitted over a stub end 11 of a conductor adapter 12. The other end of the conductor adapter 12 has a socket 13 in it into which is fixed the end 14 of a cable or the like electrical conductor 16. This cable 16 extends into the tail end of the casing 1 and is suitably insulated. The conductor and its adapter are suitably fixed into the stem 2 of the insulator casing 1. The fixed jaw 7 of the conductor chuck is held in place by any suitable detachable or releasable securing means, for instance by a set screw 17 extended through the fixed portion of the insulating head 3. A movable conductor jaw 18 complemental to the fixed conductor jaw 7, is fitted into the hinged head section 4 and is held in place thereon by a set screw 19 so as to swing into open and closed positions with said hinged head section 4. A handle 21 extends from the hinged head section 4 toward the tail of the casing 1 and is spaced from the stem 2. Between the stem 2 and the handle 21 is a U shaped spring 22 so secured to the stem 2 that the legs of the spring 22 point toward the tail end of the stem 2. The handle 21 is on the outer leg 23 of the spring 22 so that the spring 22 normally urges the handle 21 outwardly, away from the stem 2 and thus closes the movable head section 4 and the chuck jaw 18.

The jaws 7 and 18 of the conductor chuck form a recess 24 tightly fitting in complete tight contact over the head 26 of a stud 27 so that the head of the stud 27 is held in tight contact also with the bottom 28 formed by the base of the chuck jaws 7 and 18. A groove 29 around the base of the chuck recess is provided beyond the taper of the recess 24 to assure contact of the stud head against said base. Chuck jaws fitting various shapes of stud heads and ends are interchangeable and can be easily secured or removed from the head of the insulator casing by first removing the screws 17 and 19 and then replacing said screws into the replaced chuck jaws. This readily permits the gripping of the stud 27 in the conductor chuck jaws 7 and 18 and the pushing of the stud 27 through an insulator lining 31 so that the tip 32 is held in loose contact with the face of a metal plate 33 to which it is to be welded.

The chuck jaws 7 and 18, the adapter 12 and the end 14 of the conductor 16 form an electrode for the electric current to be passed through the stud 27 and the plate 33. The plate 33 is grounded as indicated at 34. The conductor 16 is connected to a circuit breaker 36 through which it is connected by a conductor line 37 to one of the terminals of a direct current welding generator 38. The other terminal of the direct current generator 38 is grounded at 39. Thus when the circuit breaker 36 is closed the welding circuit is closed from the generator 38 through the line 37, the circuit breaker 36, the conductor 16, the end 14, the adapter 12, the chuck jaws 7 and 18, the stud 27, the plate 33 and through the grounds 34 and 39 back to the generator 38.

The circuit breaker 36 is normally open, as indicated by the spring 41, and is closed by an electro-magnet 42. This electro-magnet 42 is energized by an alternating current circuit. A terminal of this electro-magnet 42 is connected by a line 43 to a terminal of a source of alternating current electricity indicated by an alternating current generator 44. The other terminal of the electro-magnet 42 is connected by a line 46 to another electro-magnetic circuit breaker 47, which is normally open as indicated diagrammatically by a spring 48. The circuit breaker 47 in turn is connected by a line 49 to the other terminal of the alternating current generator 44, so that when this second circuit breaker 47 is closed it closes the circuit to the electro-magnet of the first circuit breaker 36 and closes the circuit of the welding current.

This electro-magnet 51 of the second circuit breaker is connected by a line 52 to the same side of the alternating current generator 44 as the line 43 of the first circuit breaker 42. The other terminal of the electro-magnet 51 is connected by a shunt line 53 to a normally open circuit breaker 54, the opening of which is indicated by a spring 56. The second circuit breaker, as shown herein, is preferably a double circuit breaker which includes both the circuit breaker 47, which controls the line 46 leading to the direct current control, and also the circuit breaker 54 which controls the shunt line 53 for energizing the electro-magnet 51 which latter simultaneously closes its own shunt line 53 and also the line 46 for said direct current control.

The energizing circuit of the electro-magnet 51 of the second circuit breaker is opened after a predetermined time of operation by a normally closed delayed action circuit breaker diagrammatically indicated at 57. A bridge 58 is interconnected in the line 52 and is held closed by a compression spring 59. Spaced from the bridge 58 is a solenoid 61, the core 62 of which is movable toward the bridge 58. The solenoid 61 is connected by a line 63 to the shunt line 53 so as to conduct the current when the shunt circuit breaker 54 is closed. The other terminal of the solenoid 61 is connected by a line 64 to the line 52 and to the other terminal of the alternating current generator. The core 62 of the solenoid 61 is secured to a diaphragm indicated at 66, which latter is suitably supported at its circumference in a housing 67 so that the diaphragm 66 is hollowed in a direction away from the bridge 58. Beneath the diaphragm 66 is a pump chamber 68 with a vent 69 adjustable by any suitable mechanism such as a needle valve indicated at 71. When the solenoid 61 is energized, the movement of the core 62 toward the circuit breaker bridge 58 is retarded by the suction beneath the diaphragm 66 in accordance with the air intake through the vent 69 as adjusted by the needle valve 71. After a period of time thus predetermined the solenoid core 62 abuts against the bridge 58 and pushes it substantially into the open position indicated by broken lines at the top of the housing 67. The solenoid 61 of this timing device and the electromagnet 51 of the second circuit breaker are energized simultaneously and are closed until the bridge 58 is opened to break the circuit through the line 52.

It is to be noted that the showing of the various circuit breakers, and the timing device herein is diagrammatic and suitable or various types of circuit breakers and timing devices may be used in the circuit.

For instantaneous automatic starting of the welding operation I provide an auxiliary starting circuit utilizing the electrode line of the direct current welding circuit. The terminal of the alternating current generator 44, to which the shunt line 53 of the second circuit breaker is connected through the line 49, is grounded as shown at 72. An auxiliary line 73 connects the shunt line 53 to the conductor 16 of the electrode 14 to complete an alternating current circuit from the alternating current generator 44 through the lines 52 and 64 to the solenoid 61 of the timing device 57, then through the shunt lines 63 and 53 to the auxiliary line 73, and then through the conductor 16 and through the electrode 14 to the stud 27 and through the plate 33 to the plate ground 34 and to the ground 72 of the alternating current generator 44.

In operation the handle 21 of the welding gun is pressed down to open the movable jaw 18 of the conductor chuck. After the chuck is on the stud head 26 the handle 21 is released and the stud head 26 is tightly gripped against the conductor elements in the welding gun, which in fact form the electrode of the device. Then the tip of the stud is pressed through the insulator lining 31 into loose contact with the surface of the plate 33. This instantaneously closes a starting or initial alternating current circuit through the electrode and through the grounds as heretofore described. This starting circuit energizes the solenoid 61 of the delayed action circuit breaker or timing device 57 and also simultaneously energizes the electro-magnet 51 of the second circuit breaker. The second circuit breaker then closes the control circuit breaker 47 and also its shunt circuit breaker 54, substantially simultaneously shunting out the auxiliary starting circuit and closing the first control circuit breaker 36 in the manner heretofore described. The welding direct current through the conductor 16 and through the welding gun and the stud 27 pushes the stud 27 away from the plate as far as the loose contact permits and produces what may be termed an arc. The tip of the stud 27 is melted quickly. After a predetermined period the delayed action circuit breaker or timing device 57 breaks the circuit on the line 52 to the electro-magnet 51 of the second circuit breaker, and the double circuit breakers 47 and 54 open and break the shunt circuit of the delayed action circuit breaker 57 and also the line 46 to the electro-magnet 42 of the first control circuit breaker 36, and thus the welding direct current circuit is automatically opened. Thereupon the molten metal at the tip of the stud 27 rapidly solidifies and an attraction is created pulling the tip of the stud 27 tightly against the surface of the plate 33. Finally the jaws of the welding gun are opened again to release the stud head and to grip another stud to repeat the operation. This operation is performed very rapidly. In practice and actual operation where many large headed studs are used to hold an insulator layer or lining on the surface of the plate of a ship or the like, the herein described method and apparatus accomplished great saving of time, labor and material as well as it eliminates defects in end-welding such as splattering of metal, air pockets and the disturbance of molecular structure in the weld.

It is to be noted that in operation, when the timer breaks the circuit of the various circuit breakers, the core 62 is held in the circuit breaking position until after the gun is removed from the stud 27. The solenoid 61 during this period remains energized because as soon as the circuit breakers are open and the direct current flow ceases, the ground circuit through the auxiliary line 73 is again closed and thus the energizing circuit of the timing solenoid 61 remains effective until the ground circuit is broken by removing the gun from the stud 27. Thereupon the solenoid 61 is de-energized and the action of the spring 59 returns the circuit breaker bridge 58 and the core 62 to the initial circuit closing position ready for the next operation.

I claim:

1. An electric welding apparatus comprising, an electrode, means to tightly contact the electrode with an element to be welded to another element, means to connect said electrode to a direct current electric circuit, a normally open electro-responsive circuit breaker to break said direct current electric circuit, a normally open electro-responsive circuit breaker to control said first circuit breaker, electro-responsive timing-means to hold said second circuit breaker closed for a predetermined period for closing said first circuit breaker for the same period, a source of alternating current electricity connected to said holding means and to said circuit breakers, and a starting circuit momentarily completed through said electrode to said holding means and to said second circuit breaker for energizing said holding means and initially closing said second circuit breaker, and means on said second circuit breaker for shunting said alternating current to said timing means and to said second circuit breaker independent of said electrode and in place of said momentary energizing circuit when said second circuit breaker is closed.

2. An electric welding apparatus comprising, an electrode, a welding gun adapted to hold an element to be welded in tight contact with said electrode, a source of direct current electricity, a conductor line to connect the electrode to a terminal of said source of electricity, a normally open electro-magnetic circuit breaker interconnected in said conductor line, a separate electric circuit to close said electro-magnetic circuit breaker, a second normally open electro-magnetic circuit breaker interconnected in said separate electric circuit of said first circuit breaker, timing means to open the circuit to said second circuit breaker after a predetermined period so as to complete the energizing circuit of said first circuit breaker, a starting electric circuit connected to said timing means and to said second open circuit breaker for initially energizing said second circuit breaker, said starting circuit including said electrode and the elements to be welded together, and means on said second circuit breaker actuated by the energizing of said second circuit breaker to shunt said second circuit to said actuating means of said second circuit breaker for energizing the same and to shunt out said starting circuit.

3. An electric welding apparatus comprising, a welding conductor, means on the welding conductor to hold an element to be welded in tight contact with said conductor, a source of welding direct current electricity, a normally open electromagnetic circuit breaker to break the circuit between said source of electricity and said conductor and to close said circuit when the electromagnet of said circuit breaker is energized, an alternating current electric circuit for energizing the electro-magnet of said circuit breaker for closing the same, a second normally open electromagnetic circuit breaker connected in said alternating current circuit so as to close said alternating current circuit when the electro-magnet of said second circuit breaker is energized, said direct current welding circuit being completed through said conductor, said element and through the member to which said element is welded, an auxiliary alternating current circuit completed through said conductor, said element and said member for initially energizing the electro-magnet of said second circuit breaker, a normally open shunt circuit closer on said second circuit breaker being closed by the action of the electromagnet of said second circuit breaker simultaneously with the closing of said second circuit breaker, said shunt circuit closer being connected between said first alternating current circuit and the electro-magnet of said second circuit breaker to shunt the first alternating current circuit to said second electro-magnet simultaneously with the closing of said second circuit breaker by the action of said auxiliary circuit, and means to break said first alternating current circuit after a predetermined period of welding.

4. An electric welding apparatus comprising, a welding gun adapted to hold an element to be welded against another element, a source of direct current electricity, means to connect the part of the gun contacting said element to a terminal of said source of electricity, a circuit breaker interconnected between said connecting means and said source of electricity, said circuit breaker being normally open, electro-magnetic means for closing said circuit breaker, a separate electric circuit to actuate said electro-magnetic means, a second normally open electro-magnetic circuit breaker to control said separate electric circuit, an auxiliary electric circuit being closed through said contacting part of said welding gun and through the elements to be welded together to initially energize the electro-magnet of the second circuit breaker and close said second breaker, means on said second circuit breaker actuated by the initial energizing of said second circuit breaker to feed said second circuit back to the electro-magnet of said second circuit breaker for maintaining the same energized and to shunt out said auxiliary circuit, one of said elements being grounded and said direct current circuit and said auxiliary alternating current circuit being completed through said grounded element.

5. An electric welding apparatus comprising, a welding gun adapted to hold an element to be welded against another element, a source of direct current electricity, means to connect the part of the gun contacting said element to a terminal of said source of electricity, a circuit breaker interconnected between said connecting means and said source of electricity, said circuit breaker being normally opened, electro-magnetic means for closing said circuit breaker, a separate electric circuit to actuate said electromagnetic means, a second normally open electro-magnetic circuit breaker to control said separate electric circuit, an auxiliary electric circuit being closed through said contacting part of said welding gun and through the elements to be welded together to initially energize the electromagnet of the second circuit breaker and close said second breaker, means on said second circuit breaker actuated by the initial energizing of said second circuit breaker to feed said second circuit back to the electro-magnet of said second circuit breaker for maintaining the same energized and to shunt out said auxiliary circuit, one of said elements being grounded and said direct current circuit and said auxiliary alternating current circuit being completed through said grounded element, an electrically actuated and normally closed delayed action circuit breaker connected in series with the electromagnet of the second circuit breaker so as to break the circuit of said last electro-magnet after a predetermined period of welding, and connecting means between the electric actuating elements of said delayed action circuit breaker in series with the feed back circuit of said second circuit breaker and in parallel with said auxiliary circuit of said second circuit breaker.

6. A riveting gun of the character described comprising a hollow casing made of insulating material, an electric conductor secured in said casing, a gunhead on said casing, said gunhead having a movable section thereon, a handle on said movable section for manipulating the same to opened and closed positions, and a conductor chuck in the head of said casing adapted to grip the head of an element to be welded, at least one section of said chuck being movable relatively to the other section of the chuck, said movable chuck section being secured to said movable section of said head so as to be moved therewith into opened or closed positions.

7. A riveting gun of the character described comprising a hollow casing made of insulating material, an electric conductor secured in said casing, a gunhead on said casing, said gunhead having a movable section thereon, a handle on said movable section for manipulating the same to opened and closed positions, and a conductor chuck in the head of said casing adapted to grip the head of an element to be welded, at least one section of said chuck being movable relatively to the other section of the chuck, said movable chuck section being secured to said movable section of said head so as to be moved therewith into opened or closed positions, and means to detachably secure said chuck in said casing in conducting relation to said conductor in the casing.

8. A riveting apparatus of the character described comprising a hollow casing made of insulating material, an electric conductor secured in said casing, a gunhead on said casing, said gunhead having a movable section thereon, a handle on said movable section for manipulating the same to opened and closed positions, and a conductor chuck in the head of said casing adapted to grip the head of an element to be welded, at least one section of said chuck being movable relatively to the other section of the chuck, said movable chuck section being secured to said movable section of said head so as to be moved therewith into opened or closed positions, a direct current welding circuit, said conductor being connected to said welding circuit, a system of circuit breakers operated by an alternating current circuit independent of said conductor keeping said welding circuit normally open and keeping said welding circuit closed for a predetermined period during welding, an auxiliary starting circuit completed through said conductor and the elements to be welded to start the action of said alternating current circuit for initially closing said welding circuit when said elements to be welded are first contacted, and means actuated by the initial operation of said alternating current circuit to shunt out said starting circuit when said welding circuit is closed.

ROBERT C. CUNNINGHAM.